(12) United States Patent
Roberts et al.

(10) Patent No.: US 8,097,554 B2
(45) Date of Patent: Jan. 17, 2012

(54) APPARATUS FOR REMOVING SOOT FROM DIESEL ENGINE EXHAUST STREAMS AT TEMPERATURES AT OR BELOW 150° C.

(75) Inventors: Thomas Richard Roberts, Rochester, NY (US); Dennis Roland Fronheiser, Rochester, NY (US); Thomas A. Iacubucci, Brockport, NY (US)

(73) Assignee: AirFlow Catalyst Systems, Inc., Rochester, NY (US)

( * ) Notice: Subject to any disclaimer, the term of this patent is extended or adjusted under 35 U.S.C. 154(b) by 559 days.

(21) Appl. No.: 12/367,872

(22) Filed: Feb. 9, 2009

(65) Prior Publication Data

US 2010/0199649 A1    Aug. 12, 2010

(51) Int. Cl.
*B01D 53/56* (2006.01)
*B01J 23/34* (2006.01)
*B01J 23/745* (2006.01)
*F01N 3/24* (2006.01)
*F01N 3/035* (2006.01)
*B01D 53/86* (2006.01)
*B01D 53/94* (2006.01)

(52) U.S. Cl. ......... 502/324; 422/171; 422/180; 501/126
(58) Field of Classification Search .............. 502/324; 422/169, 170, 171, 180; 501/126
See application file for complete search history.

(56) References Cited

U.S. PATENT DOCUMENTS

| | | | |
|---|---|---|---|
| 3,983,021 A * | 9/1976 | Henis | 204/164 |
| 4,003,976 A * | 1/1977 | Komatsu et al. | 423/213.5 |
| 4,902,487 A | 2/1990 | Cooper et al. | |
| 5,196,390 A * | 3/1993 | Tauster et al. | 502/251 |
| 5,746,989 A | 5/1998 | Murachi et al. | |
| 6,293,096 B1 | 9/2001 | Khair et al. | |
| 6,770,252 B2 | 8/2004 | Cheng | |
| 6,813,884 B2 | 11/2004 | Shigapov et al. | |
| 6,889,498 B1 | 5/2005 | Chandler et al. | |
| 6,912,847 B2 | 7/2005 | Deeba | |

(Continued)

FOREIGN PATENT DOCUMENTS

EP    1 541 219 A1    6/2005

(Continued)

OTHER PUBLICATIONS

Huang and Yang; Removal of NO By Reversible Adsorption on Fe—Mn Based Transition Metal Oxides; Langmuir, vol. 17, No. 16, 2001, pp. 4997-5003.

(Continued)

*Primary Examiner* — Jill Warden
*Assistant Examiner* — Joye L Woodard
(74) *Attorney, Agent, or Firm* — Harris Beach PLLC; Laura W. Smalley

(57) ABSTRACT

An apparatus for removing soot from diesel engine exhaust streams at temperatures below 150° C. is provided. Although the use of particulate filters for removing carbonaceous soot from such exhaust streams is known, such systems are either active or operate under high temperatures, i.e. in excess of 300° C. The claimed apparatus includes a flow through support device composed of ceramic, such as cordierite or silicon carbide, or a primarily nonferrous metal or stainless steel and coated with an oxide formation comprising hematite and bixbyite in a ratio from 1:1 to 9:1. The claimed apparatus can also include a diesel particulate filter coated with a coating comprising tin, aluminum and zirconium oxides prepared by a co-precipitation process and thereafter coated with platinum or other precious metal.

36 Claims, 1 Drawing Sheet

U.S. PATENT DOCUMENTS

2006/0029535 A1 2/2006 Ott
2006/0159607 A1 7/2006 Ott
2007/0245724 A1* 10/2007 Dubkov et al. .................. 60/299

FOREIGN PATENT DOCUMENTS

WO WO 2006/026775 A3 3/2006

OTHER PUBLICATIONS

Kolk and Albers and Leity and Howden; Mossauer and X-ray Studies of the Structure of Iron-Manganese Oxide Catalyst Precursors; Applied Catalysis, 37 (1988) 57-74, pp. 57-74.

Baldi, Escribano, Amores, Milella and Busca; Characterization of manganese and iron oxides as cumbustion catalysts for propane and propene; Applied Catalysis B: Environmental 17 (1998); pp. L175-L182.

Qi and Yang; Low-temperature selective catalytic reduction of NO with NH3 over iron and manganese oxides supported on titania; Applied Catalysis B: Environmental 44 (2003); pp. 217-225.

Lai, Shafi, Ulman, Loos, Yan, Cui, Vogt, Estournes and Locke; Mixed Iron—Manganese Oxide Nanoparticles; J. Phys. Chem B 2004, 108; pp. 14876-14883.

Tikhomirov, Krocher, Elsener, and Wokaun; MnOx-Ce02 mixed oxides for the low-temperature oxidation of diesel soot; Applied Catalysis B: Environmental 64 (2006; pp. 72-78.

Crocker; Development of Nitric Oxide Oxidation Catalysts for the Fast SCR Reactions; Report submitted to Center for Applied Energy Research, issued Nov. 21, 2005.

Qu and Yang; Performance and kinetics study for low-temperature SCR of NO with NH3 over MnOx-CeO2 catalyst; Journal of Catalysis 217 (2003); pp. 434-441.

Wu, Jiang and Liu; Effect of transition metals addition on the catalyst of manganese/titania for low-temperature selective catalytic reduction of nitric oxide with ammonia; Applied Catalysis B: Environmental 79 (2008); pp. 347-355.

Setiabudi, Makkee and Moulijn; The role of NO2 and O2 in the accelerated combustion of soot in diesel exhaust gasses; Applied Catalysis B: Environmental 50 (2004) pp. 185-194.

Avgouropoulos, Ioannides and Matralis; Influence of the preparation method on the performance of CuO-CeO2 catalysts for the selective oxidation of CO; Applied Catalysis B: Environmental 56 (2005); pp. 87-93.

* cited by examiner

APPARATUS FOR REMOVING SOOT FROM DIESEL ENGINE EXHAUST STREAMS AT TEMPERATURES AT OR BELOW 150° C.

This disclosure relates to the purification of contaminants and particulates from exhaust gases. More particularly, this disclosure relates to a passively-regenerated diesel filter for the removal of soot from diesel exhaust gas at low temperatures.

BACKGROUND OF THE INVENTION

In order to meet increasingly stringent exhaust emission standards, the exhaust emitted from internal combustion engines needs to be treated prior to being emitted. In the context of gasoline engines, catalytic converters have become ubiquitous in the industry to attempt to remove harmful materials from the exhaust. In the near future, diesel engines will be required to have advanced engine emission abatement devices as well. Such abatement devices for diesel engines present different problems than those for gasoline engines. In addition to the formation of complex nitrogen gases, carbon monoxide and raw hydrocarbons, as also occurs in gasoline engines, diesel engine exhaust contains particulate matter or soot, elemental carbon coated with organics comprising residues from unburned fuel and lubricating oils. In addition, the low temperature of diesel exhaust (approximately 150 to 350° C.) compared to the temperature of exhaust emitted from gasoline engines (approximately 900° C.) requires catalysts that can destroy diesel exhaust components under those temperature conditions. Soot, which consists of finely divided carbon and hydrocarbons, is particularly difficult to remove from diesel exhaust at normal operating temperatures.

A device known as a diesel particulate filter (DPF) is one way to remove soot from diesel engine exhaust gas. These filters, made of a porous ceramic or metal substrate, allow the exhaust gases to pass through the filter but trap these small carbon particles. These filters, however, often become clogged with the soot which the engine generates, causing a potentially-harmful backpressure increase in the engine.

So-called active regeneration devices exist that use heat or chemicals (or a combination of both) to remove soot from the filter. Some of these devices operate by spraying raw diesel fuel into the filter chamber and igniting the fuel and soot in situ. This process, along with the presence of oxygen, ignites the soot at a sufficiently high temperature (600° C.) to convert it into either carbon monoxide or carbon dioxide. This process temporarily clears the filter. These devices require a backpressure monitoring apparatus, a fuel injection system and instrumentation to control the monitoring of the filter and the cleaning system.

Passive regeneration devices also exist to remove carbon from the filter, but this removal also occurs at high temperatures (as high as 650° C.). These passive regeneration devices also use large amounts of platinum catalyst, which is an expensive metal.

SUMMARY OF THE INVENTION

Figure 1:
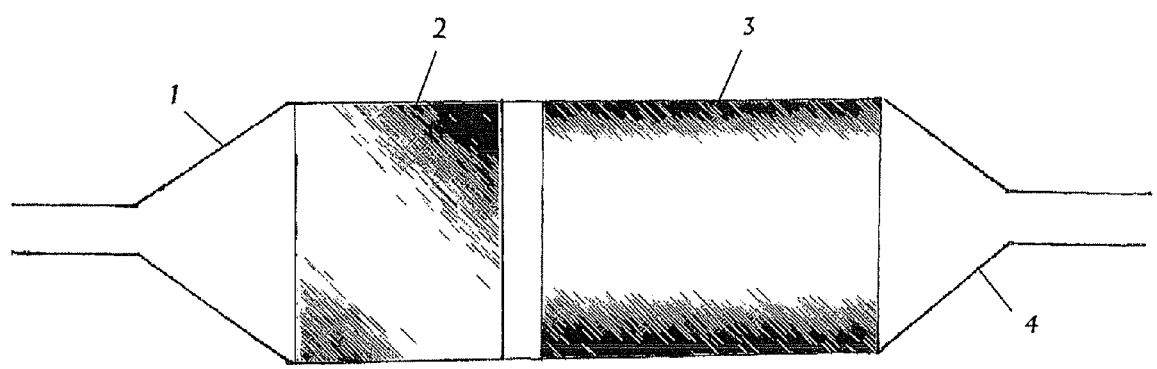
FIG. 1 shows a schematic for the claimed apparatus including the flow through device 2 and the diesel particulate filter 3 which are in fluid communication.

The disclosed invention comprises, among other things, a device with a coating comprised of hematite ($Fe_2O_3$) and bixbyite (($Mn_{1.5},Fe_{0.5})O_3$). The device oxidizes NO to $NO_2$, increasing the amount of $NO_2$ by approximately 30 to 50%. The increased amount of $NO_2$ flowing into the diesel particulate filter allows more effective oxidation of the soot. The diesel particulate filter is coated with a ceramic composition comprising, among other things, tin oxide, aluminum oxide and $CrO_2$. After the filter is coated with the ceramic composition, a coating of platinum is deposited onto the filter. In the filter, the $NO_2$ is reduced to NO and the soot is converted to water vapor, CO and $CO_2$. This process occurs at temperatures at or below 150° C. The lower temperature removal of soot is beneficial because it occurs at normal exhaust temperatures, eliminating or reducing the need for upstream fuel injection or resistive heating of the filter to achieve the normal soot oxidation temperature of approximately 600° C. when using the molecular oxygen in the exhaust gas as the soot oxidizing agent. Further, the increased $NO_2$ generation decreases the amount of platinum required in the filter, lowering the cost of the soot removal apparatus. Other benefits of the disclosed coating and apparatus exist or may be discovered.

The invention includes a coating for a substrate comprising: hematite ($Fe_2O_3$) and bixbyite (($Mn_{1.5},Fe_{0.5})O_3$) wherein the ratio of hematite to bixbyite ranges from 1:1 to 9:1. Ranges of hematite to bixbyite of approximately 4:1 to 9:1 are preferred. In another preferred embodiment, the hematite to bixbyite ratio is approximately 7:1. In any of the disclosed embodiments, the hematite and bixbyite coating may be produced by applying a solution comprising a ferric salt and a manganese salt. Preferably, the coating has a particle size in the range of 20-40 nanometers, although larger particle sizes may be used.

Also claimed is a flow through device comprising a ceramic or metal substrate and a coating, the coating comprising hematite and bixbyite wherein the ratio of hematite to bixbyite ranges from 1:1 to 9:1. Ranges of hematite to bixbyite of approximately 4:1 to 9:1 are preferred. In another preferred embodiment, the flow through device will have a coating wherein the hematite to bixbyite ratio is approximately 7:1. The hematite and bixbyite coating may be produced by applying to the device a solution comprising a precursor ferric salt and a manganese salt which produce the catalytic oxide phases of this invention on subsequent thermal processing. Preferably, the coating has a particle size in the range of 20-40 nanometers, although larger particle sizes may be used.

Also claimed is an apparatus for reducing soot from diesel engine exhaust comprising: a flow through device for receiving the exhaust comprising a ceramic or metal substrate and a ceramic coating, the coating comprising hematite and bixbyite, wherein the ratio of hematite to bixbyite ranges from 1:1 to 9:1; and where the flow through device is in fluid communication with a diesel particulate filter. A schematic for the claimed apparatus is shown in FIG. 1, which shows the inlet from the engine 1, the flow through device 2, the diesel particulate filter 3 and the exhaust outlet 4. The diesel particulate filter comprises a wall-flow type ceramic substrate with a first coating and a second coating, the first coating comprising a tin oxide, an aluminum oxide and a zirconium oxide, and the second coating comprising platinum or another precious metal. The first coating for the filter may further comprise silicon dioxide and lanthanum oxide. The first coating may also further comprise silicon dioxide and a lanthanoid oxide selected from the group consisting of cerium, praseodymium, neodymium, promethium, samarium, europium, thulium, gadolinium, terbium, dysprosium, holmium, erbium, ytterbium and lutetium.

In one embodiment, the molar ratio of the tin oxide is approximately 0.53, the molar ratio of the aluminum oxide is approximately 0.14 and the molar ratio of the zirconium oxide is approximately 0.24. In another embodiment, the molar ratio of the tin oxide is approximately 0.53, the molar ratio of the aluminum oxide is approximately 0.14, the molar ratio of the zirconium oxide is approximately 0.24, the molar ratio of the silicon dioxide is approximately 0.04 and the molar ratio of the lanthanoid oxide is approximately 0.05. In any of the disclosed embodiments, the zirconium oxide may be partially stabilized with up to 12 mole-% of yttrium lanthanum oxide.

DETAILED DESCRIPTION OF THE INVENTION

The present invention relates to an apparatus that removes harmful pollutants from diesel engine exhaust at relatively low temperatures (at or below 150° C.). The invention prevents the plugging of diesel particulate filters at relatively low temperatures. Specific catalysts alter the composition of the exhaust gases so that the gases react with the carbon and hydrocarbons formed in the diesel engine during combustion. The reaction with the carbon and hydrocarbons in the diesel particulate filter forms carbon monoxide and, after further reaction, gaseous carbon dioxide, which no longer can plug the filter.

The preferred embodiment of the apparatus includes a flow through device in fluid communication with a diesel particulate filter. Preferably, the flow through device and the diesel particulate filter can be placed in a sealed container, such as one made of stainless steel, or other suitable material, to prevent the escape of gases. The diesel exhaust is directed into the flow through device and passes first through the flow through substrate component and then into the filter before being emitted into the atmosphere.

The flow through device may be made from cordierite, stainless steel, or a primarily nonferrous metal. Alternatively, the flow through device may be made from a ceramic material or any other material common to use in the art. The substrate is coated with an oxide formulation of hematite ($Fe_2O_3$) and bixbyite (($Mn_{1.5},Fe_{0.5}$)$O_3$) wherein the ratio of hematite to bixbyite ranges from 1:1 to 1:9. Ratios from 4:1 to 9:1 also increase $NO_2$ formation at temperatures lower than 100° C. The optimum ratio of hematite to bixbyite for low temperature removal of soot is about 1:7, where the $NO_2$ formation increases by up to 50% at temperatures lower than 100° C.

In the preferred embodiment, the substrate is coated using a solution made from a ferric salt and a manganese salt prepared by the coprecipitation method. The substrate is coated immediately after the ferric salt and manganese salt are combined. The coated substrate is dried and calcined at 500° C. for two hours. During the drying, the coating undergoes a shrinkage process which causes micro-cracks to form in the surface, increasing the surface area of the coating. The heating, among other things, stabilizes the oxidation state of the composition and bonds the individual grains to the surface of the substrate. Crystallographic changes also occur during the heating process, where the small precipitates become crystals, further increasing the surface area. Thereafter, the material goes through a shrinkage process during the heating due to water loss and sintering. It is understood that the coating may be prepared in any other manner that creates the correct proportion of hematite and bixbyite and results in a thin layer of the coating covering the surface of the substrate.

The diesel particulate filter, which may be of any type known in the art, may be coated with a ceramic that may have reactive properties as long as the formation of $NO_2$ is not affected. A coating comprised of tin oxide, aluminum oxide and zirconium oxide is then placed on the filter. In one embodiment, the molar ratio of the tin oxide will be approximately 0.53, the molar ratio of the aluminum oxide will be approximately 0.14 and the molar ratio of the zirconium oxide will be approximately 0.24. The coating may also additionally be composed of silicon dioxide and lanthanum oxide. The oxide of any lanthanoid of Group IIIA of the periodic table, including cerium, praseodymium, neodymium, promethium, samarium, europium, thulium, gadolinium, terbium, dysprosium, holmium, erbium, ytterbium and lutetium, may be substituted for the lanthanum oxide. In one embodiment, the molar ratio of the tin oxide is approximately 0.53, the molar ratio of the aluminum oxide is approximately 0.14, the molar ratio of the zirconium oxide is approximately 0.24, the molar ratio of the silicon dioxide is approximately 0.04 and the molar ratio of the lanthanoid oxide is approximately 0.05.

Preferably, the aluminum oxide is gamma alumina coated with silica. The remaining oxides may be added as salts and hydroxides which are mixed into the alumina-silica mixture to make a fine precipitate. Thereafter, the precipitate may be washed and dried, and thereafter ground to an apparent particle size of approximately 0.1 and 0.9 micrometers prior to coating. The final coating, after application and drying, will have an average particle size of 20 to 40 nanometers.

A coating of platinum or other precious metal, including palladium, gold or silver, is placed on the filter after the ceramic coating. Preferably, the platinum or other precious metal may be applied as a nitrate or a tetraamine platinum nitrate. The percentage of platinum (or other precious metal) may vary with the application and the system design, ranging from approximately 0.5 grams per liter to 5.0 grams per liter. The platinum or other precious metal may be applied through various methods, including submersion, waterfall coating, spraying or any other recognized coating method. The filter is then heat treated at 500° C. The preferred result of the coating process, regardless of the method, is a uniform nano-sized dispersion of the platinum metal over the ceramic coating. Any fairly uniform dispersion of the platinum within commercially acceptable tolerances may be used, however.

The invention removes soot from the diesel particulate filter at low temperatures (at or less than 150° C.). In one of the preferred embodiments, the Group IIIA elements (including lanthanum) oxidize CO and HC as well as carbon at low temperatures. The flow through device facilitates the operation of the filter by increasing the amount of $NO_2$, a low temperature soot oxidizing agent, flowing into the diesel particulate filter.

Ideally, the apparatus would use both the hematite ($Fe_2O_3$) and bixbyite (($Mn_{1.5},Fe_{0.5}$)$O_3$) oxidation catalyst of this invention and the diesel particulate filter coated with the platinum oxidation catalyst. The flow through device, however, may be used with other filters and may have applications other than those stated. The coating itself may also be used in any application where the increased conversion of NO to $NO_2$ is desired.

What is claimed is:

1. A coating for a substrate, comprising: hematite ($Fe_2O_3$) and bixbyite (($Mn_{1.5},Fe_{0.5}$)$O_3$) wherein the ratio of hematite to bixbyite ranges from 1:1 to 9:1.

2. A coating according to claim 1 wherein said hematite and bixbyite are applied as a solution comprising a ferric salt and a manganese salt.

3. A coating according to claim 1 wherein the hematite to bixbyite ratio is approximately 7:1.

4. A coating according to claim 3 wherein said hematite and bixbyite are applied as a solution comprising a ferric salt and manganese salt.

5. A coating according to claim 1 wherein the hematite to bixbyite ratio ranges from approximately 4:1 to 9:1.

6. A coating according to claim 5 wherein said hematite and bixbyite are applied as a solution comprising a ferric salt and manganese salt.

7. A coating according to claim 1 wherein the coating has a particle size in the range of 20-40 nanometers.

8. A coating according to claim 2 wherein the coating has a particle size in the range of 20-40 nanometers.

9. A coating according to claim 3 wherein the coating has a particle size in the range of 20-40 nanometers.

10. A coating according to claim 4 wherein the coating has a particle size in the range of 20-40 nanometers.

11. A coating according to claim 5 wherein the coating has a particle size in the range of 20-40 nanometers.

12. A coating according to claim 6 wherein the coating has a particle size in the range of 20-40 nanometers.

13. A flow through device comprising a ceramic or metal substrate and a ceramic coating, the coating comprising hematite ($Fe_2O_3$) and bixbyite (($Mn_{1.5},Fe_{0.5})O_3$) wherein the ratio of hematite to bixbyite ranges from 1:1 to 9:1.

14. The flow through device of claim 13, wherein said hematite and bixbyite are applied as a solution comprising a ferric salt and a manganese salt.

15. The flow through device of claim 13, wherein the hematite to bixbyite ratio is approximately 7:1.

16. The flow through device of claim 15, wherein said hematite and bixbyite are applied as solution comprising a ferric salt and a manganese salt.

17. The flow through device of claim 13 wherein the hematite to bixbyite ratio ranges from approximately 4:1 to 9:1.

18. The flow through device of claim 17 wherein said hematite and bixbyite are applied as solution comprising a ferric salt and a manganese salt.

19. A coating according to claim 13 wherein the coating has a particle size in the range of 20-40 nanometers.

20. A coating according to claim 14 wherein the coating has a particle size in the range of 20-40 nanometers.

21. A coating according to claim 15 wherein the coating has a particle size in the range of 20-40 nanometers.

22. A coating according to claim 16 wherein the coating has a particle size in the range of 20-40 nanometers.

23. A coating according to claim 17 wherein the coating has a particle size in the range of 20-40 nanometers.

24. A coating according to claim 18 wherein the coating has a particle size in the range of 20-40 nanometers.

25. An apparatus for reducing soot from diesel engine exhaust that comprises: a flow through device for receiving the exhaust comprising a ceramic or metal substrate and a ceramic coating, the coating comprising hematite ($Fe_2O_3$) and bixbyite (($Mn_{1.5},Fe_{0.5})O_3$), wherein the ratio of hematite to bixbyite ranges from 1:1 to 9:1; and wherein said flow through device is in fluid communication with a diesel particulate filter comprising: a filter, a first coating comprising a tin oxide, an aluminum oxide and a zirconium oxide, and a second coating comprising platinum or other precious metal.

26. An apparatus according to claim 25 wherein the first coating further comprises silicon dioxide and lanthanum oxide.

27. An apparatus according to claim 25 wherein the first coating further comprises silicon dioxide and a lanthanoid oxide selected from the group consisting of cerium, praseodymium, neodymium, promethium, samarium, europium, thulium, gadolinium, terbium, dysprosium, holmium, erbium, ytterbium and lutetium.

28. An apparatus according to claim 25 wherein the zirconium oxide is partially stabilized with up to 12 mole-% of yttrium lanthanum oxide.

29. An apparatus according to claim 26 wherein the zirconium oxide is partially stabilized with up to 12 mole-% of yttrium lanthanum oxide.

30. An apparatus according to claim 27 wherein the zirconium oxide is partially stabilized with up to 12 mole-% of yttrium lanthanum oxide.

31. An apparatus according to claim 25 wherein the molar ratio of the tin oxide is approximately 0.53, the molar ratio of the aluminum oxide is approximately 0.14 and the molar ratio of the zirconium oxide is approximately 0.24.

32. An apparatus according to claim 26 wherein the molar ratio of the tin oxide is approximately 0.53, the molar ratio of the aluminum oxide is approximately 0.14, the molar ratio of the zirconium oxide is approximately 0.24, the molar ratio of the silicon dioxide is approximately 0.04 and the molar ratio of the lanthanum oxide is approximately 0.05.

33. An apparatus according to claim 27 wherein the molar ratio of the tin oxide is approximately 0.53, the molar ratio of the aluminum oxide is approximately 0.14, the molar ratio of the zirconium oxide is approximately 0.24, the molar ratio of the silicon dioxide is approximately 0.04 and the molar ratio of the lanthanoid oxide is approximately 0.05.

34. An apparatus according to claim 31 wherein the zirconium oxide is partially stabilized with up to 12 mole-% of yttrium lanthanum oxide.

35. An apparatus according to claim 32 wherein the zirconium oxide is partially stabilized with up to 12 mole-% of yttrium lanthanum oxide.

36. An apparatus according to claim 33 wherein the zirconium oxide is partially stabilized with up to 12 mole-% of yttrium lanthanum oxide.

* * * * *